R. GLABAZNYA.
VEHICLE TIRE.
APPLICATION FILED JUNE 24, 1911.
1,020,549.
Patented Mar. 19, 1912.
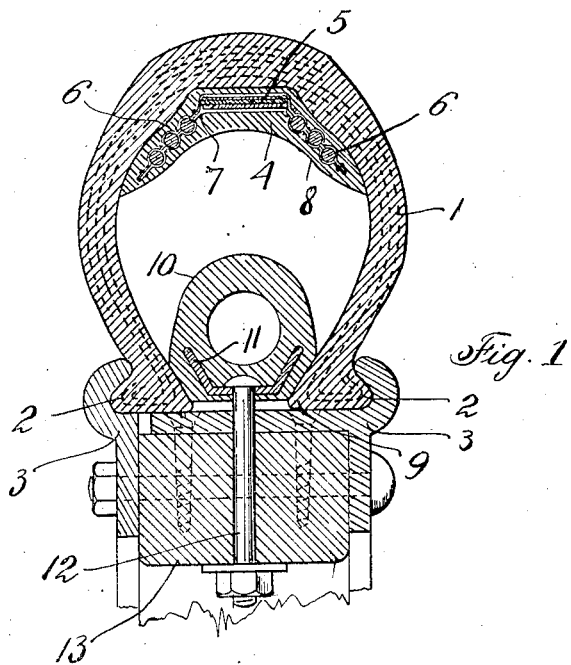
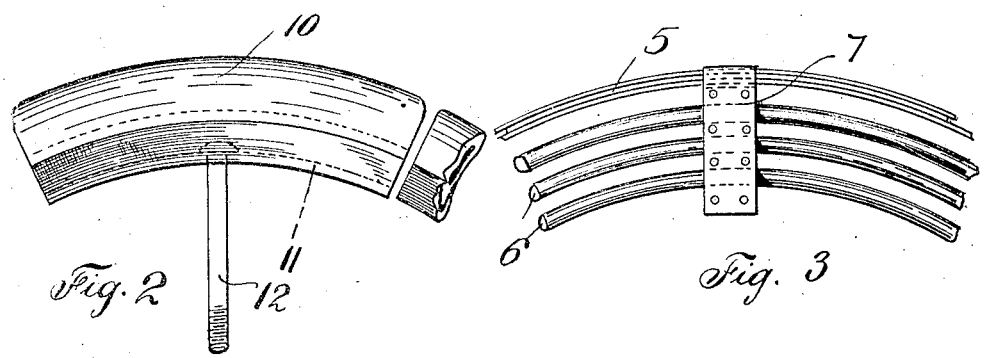
WITNESSES
A. R. Gustafson
Rudolph Welss
INVENTOR
Rudolph Glabaznya
By Robt. Klotz
Atty.

BEST AVAILABLE COPY

UNITED STATES PATENT OFFICE.

RUDOLPH GLABAZNYA, OF CHICAGO, ILLINOIS.

VEHICLE-TIRE.

1,020,549.  Specification of Letters Patent.  Patented Mar. 19, 1912.

Application filed June 24, 1911. Serial No. 635,162.

*To all whom it may concern:*

Be it known that I, RUDOLPH GLABAZNYA, a subject of the Emperor of Austria-Hungary, and residing at Chicago, in the county of Cook and State of Illinois, have invented a new and useful Improvement in Vehicle-Tires, of which the following is a complete specification.

The main objects of this invention are to provide an improved construction of vehicle tire; to provide a vehicle tire having a maximum amount of resiliency and durability; to provide a vehicle tire having an auxiliary stiffening member within the casing adapted to increase the resiliency of the tire; to provide a vehicle tire in which the resiliency of the tire casing is supplemented by a removable annular stiffening member; to provide a vehicle tire having buffers adapted to limit the compression of the tire; to provide a tire having all of the advantages of a pneumatic tire but not subjected to blow-outs and like troubles; and to provide a strong and durable tire adapted to be constructed at a minimum cost.

A specific embodiment of the invention is illustrated in the accompanying drawings, in which:

Figure 1 is a transverse section of a vehicle tire embodied in this invention, and shown mounted on a vehicle wheel. Fig. 2 is a side elevation of one of the buffers and a portion of an adjoining one, showing their arrangement in the tire. Fig. 3 is a fragmentary side elevation of the springs for the stiffening member.

In the construction shown the tire casing 1 is constructed of rubber and canvas vulcanized together in the ordinary manner, and is provided with attaching ribs 2 adapted to be clamped in the wheel rim 3, which may be of any usual or well known construction.

Within the casing 1 is the removable, annular stiffening member 4 which is of an outer circumference to fit closely to the inner circumference or surface of the tread portion of the casing. Said stiffening member 4 comprises a plurality of annular bands 5 of spring metal which are arranged one within the other and extend longitudinally of the tire, and at each side of said bands are a plurality of rings 6 of spring metal, which rings are arranged concentric with the bands 5 along the sides of the casing and decrease in diameter in regular order with reference to the distance removed from the bands. Connecting said bands and rings together are a plurality of approximately V-shaped outer and inner plates 7 which are bent to partially encircle said bands and rings and are riveted together between the same, as shown more clearly in Figs. 1 and 3. Said pairs of plates are arranged suitable distances apart circumferentially of the rings and bands and act to hold the same in unvarying relation to each other. Upon said bands, rings and plates is molded a covering 8 of rubber, the outer surface of which is shaped to conform to the normal shape of the inner surface of the tread portion of the tire, and to fit closely thereto. The inner surface of the covering 8 is concaved transversely.

The stiffening member 4 may be employed in either new or old tires, since it can be easily inserted in the ordinary tire casing.

Within the tire, and adapted to rest on the edges 9 thereof, are a plurality of buffers 10 which are preferably formed of tubular sections of rubber with a metal channel bar 11 molded in the side thereof adjacent to the vehicle rim. A bolt 12 is connected with each bar 11 and is adapted to extend through the wheel felly 13.

The operation of the construction shown is as follows: When the tire is compressed or flattened on the side contacting with the road surface, the stiffening member 4 takes the strain and acts to resist such compression. Should the stiffening member also be flattened sufficiently it will contact with the buffers 10 which will add their resistance thereto.

While but one specific embodiment of the invention has been shown and described it will be understood that many details of the construction shown may be varied or omitted without departing from the scope of the claim.

I claim:

A removable stiffener for vehicle tires comprising a plurality of superimposed annular resilient bands, a plurality of annular resilient rods at each side of and spaced inwardly from said bands, conforming substantially to the contour of the tread portion of a tire, and plates connecting said bands and rods at intervals, said plates being arranged in pairs having oppositely directed recesses to receive the rods, each pair being riveted together on opposite sides of the rods, and said bands, rods and plates being embedded in an annular member of resilient material adapted to fit the inside of the tread portion of a tire, substantially as described.

In witness whereof I have hereunto subscribed my name in the presence of two witnesses.

RUDOLPH GLABAZNYA.

Witnesses:
 ROBT. KLOTZ,
 AUG. WEBB.